June 4, 1929.  C. E. F. AHLM ET AL  1,716,335
TRANSMISSION CONTROL MECHANISM
Filed April 23, 1927   2 Sheets-Sheet 1
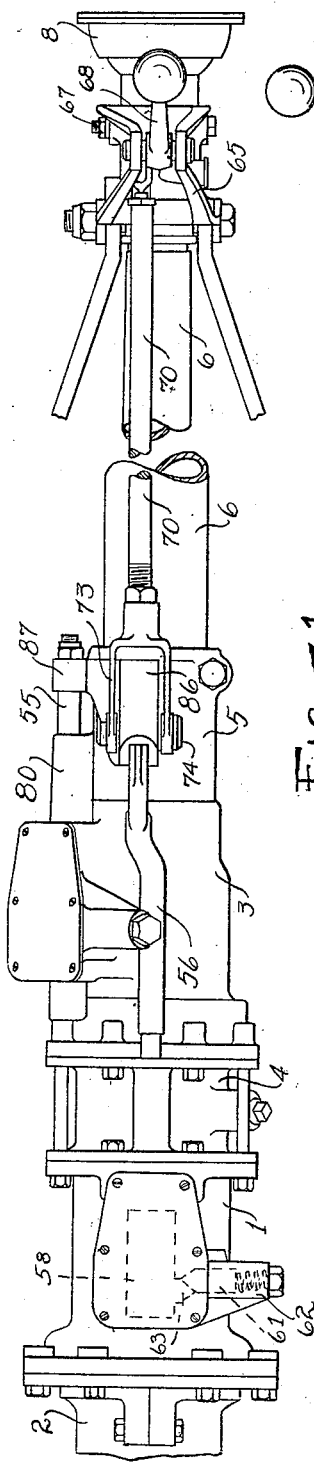
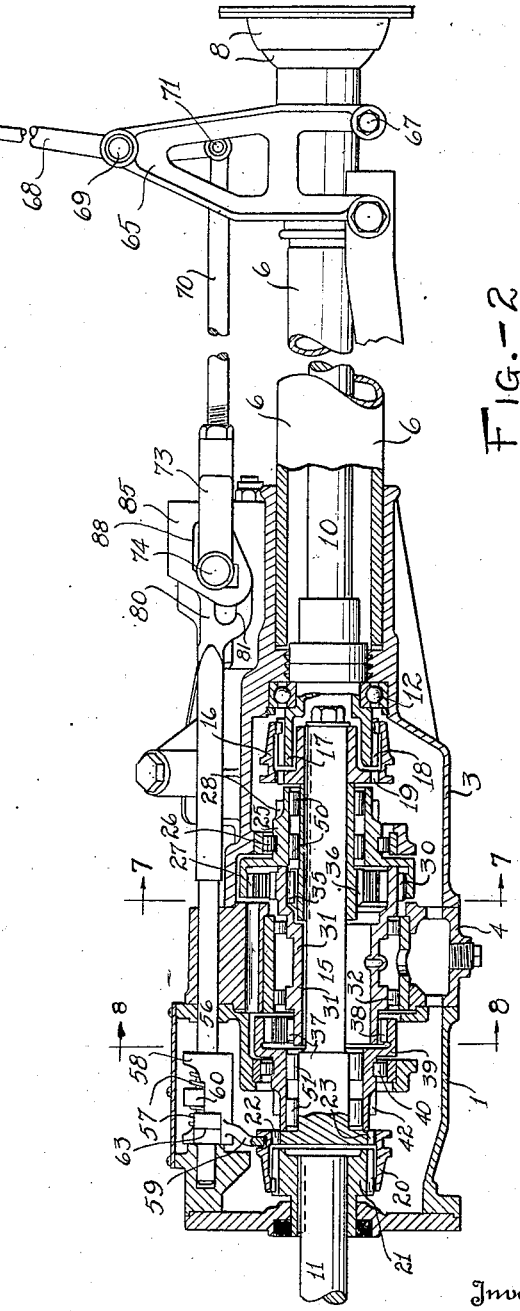
Inventors
Charles E. F. Ahlm
George L. Elmslie
By Bates, Macklin, Golrick & Teare
Attorneys

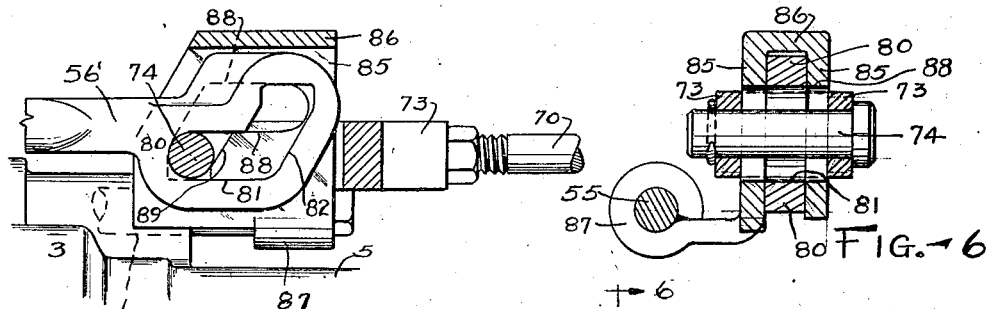
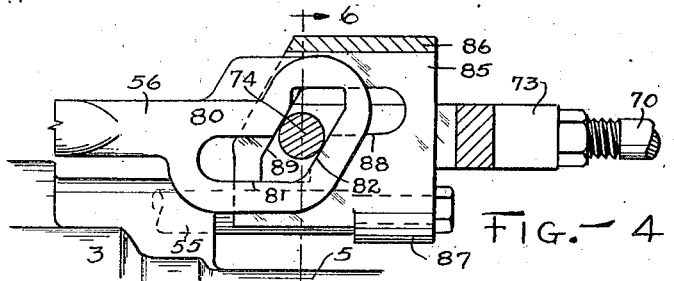
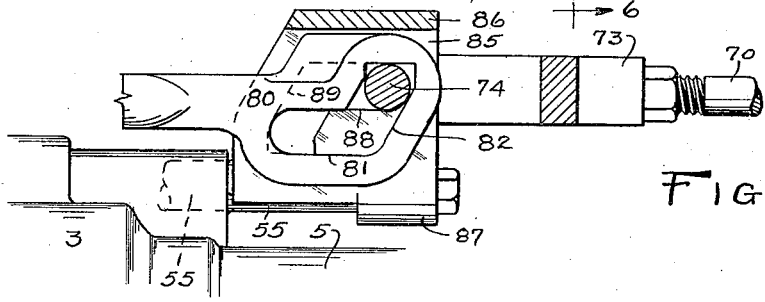
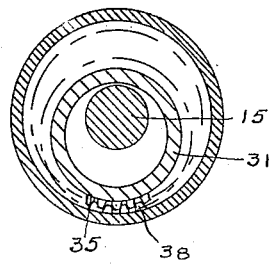
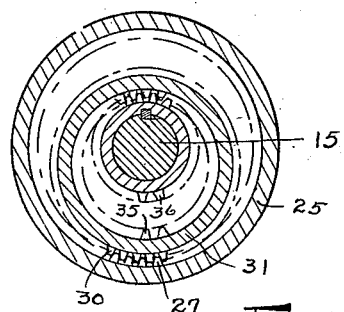

Patented June 4, 1929.

1,716,335

UNITED STATES PATENT OFFICE.

CHARLES E. F. AHLM AND GEORGE L. ELMSLIE, OF CLEVELAND, OHIO.

TRANSMISSION-CONTROL MECHANISM.

Application filed April 23, 1927. Serial No. 185,941.

This invention relates to gearing control, and particularly to a remote control for a plurality of dental clutches or gears, that are to be shifted into different relative positions to change speed.

The primary object is to provide a simple light weight and easily operated control device for a gearing.

A more specific object is to provide a simple remote control device for a gearing, having two elements such as clutches to be shifted, in which all the necessary shifting movements are effected by bodily moving a single bar. A still further object is to provide a simplified control for a multiple speed gearing which will be operable by the straight forward and rearward movement of a shift lever.

As shown in the drawings, the mechanism is applied to a gearing, the essential elements of which are shown and claimed in a copending application of Charles E. F. Ahlm, Serial No. 20,837, filed April 4, 1925. This gearing is shown as arranged to afford a direct driving relation between the propeller shaft of an automobile and the rear axle driving shaft, as well as an over-drive and an under-drive between these shafts.

In the prior patent to Charles E. F. Ahlm, No. 1,611,865, issued Dec. 28, 1926, there is shown a comparatively simple control arrangement for such a gearing, but that mechanism required a separate link or bar between the shift lever and each clutch, whereas with the present mechanism operates with only one link. This link has a pin and slot connection with shipper fork extensions from each clutch, the specific arrangement being such that the shifting of the main control bar or link to its extreme forward position conditions the gearing for under-drive, to its extreme rearward position for over-drive, and to an intermediate position for direct drive. The device shown in the Ahlm patent required that at least the lower end of the shift lever have lateral as well as longitudinal movement, and one of the distinctive advantages of the present arrangement lies in that the lever has to have only straight forward and rearward movement, wherefore the simplest sort of support for the shift lever will suffice.

Further objects and features of the invention will become apparent from the following description relating to the accompanying drawings, wherein we have shown our preferred form. The essential characteristics are summarized in the claims.

Referring briefly to the drawings, Fig. 1 is a plan view of the control mechanism adapted to control a gearing located at the rear axle of a car; Fig. 2 is a longitudinal cross sectional view through the gearing, and showing the control mechanism in side elevation; Figs. 3, 4 and 5 are sectional side elevations of certain of the parts of the control mechanism, each figure showing the parts in a different relation; Fig. 6 is a transverse cross sectional view as indicated by the lines 6—6 of Fig. 4, and Figs. 7 and 8 are transverse cross sectional views of the gearing parts, as indicated by the lines 7—7 and 8—8 on Fig. 2.

In order to illustrate the use of the control mechanism, we have shown in detail the Ahlm gearing above mentioned although it is to be understood that other gear arrangements operable by the use of clutches or sliding gears may be controlled by the mechanism shown, though perhaps differently adapted and modified.

As shown in Fig. 1 the gearing housing comprises a rear section 1 adapted to be secured to the rear axle housing 2, a front end section 3 and an intermediate section 4. The front section 3 has a tubular portion 5 embracing the rear end of a torque tube 6, which extends at its forward end into the usual ball and socket housing connection 8 for the front universal joint (not shown). The shaft 10 is the driving shaft, with relation to the gearing, and is shown as supported at one end in a bearing 12. The driven shaft designated 11, it may be assumed, is connected either by a worm or pinion to the usual ring gear of the differential gearing. 15 indicates a shaft supported intermediately of the shafts 10 and 11 on bearings 50 and 51. The three shafts 10, 11 and 15 are arranged to be connected in such manner that all of them rotate at the same speed and the same means which so connects the shafts is used to establish other connections through the gearing for obtaining the other speed relations. Such means comprises in part a clutch sleeve 16 having internal teeth engaging spline teeth 18 on an enlargement 17 at the rear end of the shaft 10, the sleeve also having internal clutch teeth shown in engagement with external clutch teeth 19 rigid with the front end of the intermediate shaft 15. The means further includes a similar clutch sleeve designated 20 shown as splined onto a member 21 on the shaft 11. The latter clutch sleeve has internal teeth 22 engaging teeth 23 at the rear end of the intermediate shaft 15.

The gears comprise as shown, a hollow internally toothed gear member 25 mounted on suitable bearings, such as 26, carried by the casing section 3, this gear member having internal gear teeth 27 at one end. The other end of the gear member 25 carries external clutch teeth 28 engageable by the internal teeth 19 of the sleeve clutch 16 in order that the shaft 10 may drive the gear member 25 directly when the sleeve is shifted to its rearmost position. The internal teeth 27 of the gear member 25 are in permanent engagement with external teeth 30 of a hollow sleeve-like gear member 31, in fixed eccentric relation to the described shafts and mounted on bearings 32 in the casing section 4. Internal teeth 35 on the sleeve-like member 31 permanently engage external teeth of a small pinion 36 rigid with the shaft 15. Assuming that the clutch sleeve 16 has been shifted to its rearmost position and that the clutch sleeve 20 is in the position shown, the gearing will now operate as an over-drive between the shafts 10 and 11, since the internal gear 27 is larger than the gear 30 and since the gear 35 is larger than the gear 36.

Disposed at the rear end of the hollow gear member 31 is a gear member 39 having teeth 38 permanently in mesh with external teeth 37 on the sleeve gear 31. The gear member 39 is supported by a bearing 40 in the casing section 1, and has external clutch teeth 42 on its rear end arranged to be engaged by the internal clutch teeth 22 of the clutch sleeve 20 when this sleeve is shifted to its forward position. Assuming that the clutch sleeve 20 has been shifted to its forward position and that the clutch sleeve 16 remains in the position shown in Fig. 2, the gearing operates as an under-speed drive between the shafts 10 and 11 because the first driving gear 36 is smaller than its corresponding driven gear 35 and because gear 37 rigid with the gear 35 is smaller than its corresponding internal gear 38.

The positions of the sleeve clutches 16 and 20 may be controlled by respective clutch shift bars 55 and 56 suitably supported for movement parallel to the shifting movement of the clutches. Each of the bars 55 and 56 may have the usual shipper fork connections with the respective clutch sleeves. As shown in Fig. 2, a special shipper fork head 58 is shown as slidable with indefinite limitation on the bar 56 against the action of oppositely acting compression springs 57. The springs 57 are contained in a recess of the head 58 which carries the fork 59 for engaging rings on the clutch sleeve 20. A nut 60 adjustably rigid on the bar 56 shifts the recessed member 58, by first compressing one or the other of the springs, depending on which direction the bar 56 is moved, and then acting upon a spring pressed plunger 61 (see Fig. 1) carried in a laterally extending boss 62. The plunger 61 is depressed by the movement of a member 58 through a lateral extending wedge shaped projection 63 coacting with the nose of the plunger in the usual manner. A similar arrangement is, of course, provided for the clutch shift bar 55, shown in Fig. 1.

In order to control the positioning of such clutch sleeves 16 and 20 by simple manual movement, as by moving a hand lever or the like straight forwardly and rearwardly of the vehicle, we mount a bracket 65 on the torque tube 6 by means of suitable clamp bolts 67 and provide a hand lever 68 pivoted on a pin 69, for straight forward and backward movement. The lower end of the lever has a link 70 pivotally attached thereto as at 71. The rear end of the link 70 has a yoke 73 adjustably secured thereto and the yoke has a round pin 74 carried at the rear bifurcated end thereof. The shipper bars 55 and 56 carry slotted members 85 and 80 respectively at their front ends. The pin 74 passes through the slots in both members. The slotted member 80 for the bar 56 comprises a flattened portion and the slot of this member is shown in full lines in Figs. 3, 4 and 5, as having a horizontally extending portion 81, and a diagonally upwardly extending portion 82. The slotted member 85 on the bar 55 is yoked over the flattened portion of the member 80 and lies over as at 86 on both sides of the member 80. The arms of the yoke 73 embrace the yoked and slotted member 85. The member 85 has a laterally extending portion 87 in the nature of a strap, by which the member 85 is secured to the bar 55. The member 85 is slotted to engage the pin 74 carried by the yoke 73. This slot has a horizontally extending portion 88 shown partly in broken lines in Figs. 3, 4 and 5 and has a downwardly and diagonally extending portion 89.

With this arrangement, when the link 70 is thrust to its rear-most position, as in Fig. 3, the pin 74 lies in the horizontal portion 81 of the slot in the member 80 and in the bottom of the diagonally extending portion 89 of the slot in the member 85. With the slotted parts in this position the clutch 20 of the gearing is in its rearward position and the clutch 16 is also in its rearward position. The clutches so positioned effect an over-driving condition of the gearing. Upon pulling the link 70 forwardly into an intermediate position the slotted parts assume the position shown in Fig. 4 and because the pin is retained while being carried forwardly within the lowermost portion 89 of the slot of the member 85, the clutch sleeve 16 is pulled to its forward driving position as shown in Fig. 2. Meanwhile the pin 74 has merely slid along the horizontal portion 81 of the slot in the member 80 and the sleeve or clutch 20 has not been moved; the clutch 20 being retained in its rearmost position by the plunger 61. This establishes the direct driving condition of the gearing. Now, when the bar 70 is pulled still farther forwardly the pin is cammed upwardly by the edges of the diagonal portions 82 and 89 of the slots until it assumes the position shown in Fig. 5. Further forward movement of the link carries the member 80 on bar 56 forwardly to shift the sleeve 20 into its forward driving position for the under-speed drive as described.

In shifting from the position shown in Fig. 3 to the intermediate position shown in Fig. 4, the horizontal portions 81 of the slot in the member 80 permit the forward movement of the pin to carry only the bar 55 forwardly, while leaving the bar 56 in its rearmost position, as shown in both Figs. 3 and 4. In shifting from the position shown in Fig. 5 to the intermediate position shown in Fig. 4, the bar 56 is moved rearwardly, while the bar 55 is retained in its foremost position by its coacting spring pressed plunger mentioned above. The bar 55 is not urged rearwardly during this shift because the pin 74 slides freely in the horizontal portions 88 of the slot of the member 85.

We claim:—

1. In a gearing control, two members each connected with a gearing element to be shifted and each being constrained to shift parallel to the other, slots in each member in offset relation, each slot having a portion extending parallel to said shifting movement, means adapted to engage both slots, each slot having a laterally extending cam portion to direct said means out of engagement with said parallel portion of one slot and into the parallel portion of the other slot as the means is moved with relation to said members.

2. In combination, a pair of slotted members mounted for parallel right line movement, each slot having a horizontal portion and a laterally extending portion, a control member for said slotted members, having a pin slidably engaging both slots and means operative when the control member is moved in either direction to force the pin out of engagement with the horizontal slot portion of one slotted member and into the horizontal slot portion of the other.

3. In a device of the character described, a pair of slotted members mounted for substantially parallel right line reciprocating movement, each slot having a horizontal portion and a diagonally extending portion and means cooperating with both slots and arranged when shifted in one direction to be cammed downwardly by one of said diagonal slot portions, and when shifted in the opposite direction to be cammed upwardly by one of said diagonal slot portions, for the purpose specified.

4. In a gearing control, a pair of slide bars mounted for substantially parallel movement, each having a longitudinally slotted portion, a control member having means for engaging the slots, means operable by the slide bar shifting movement of the control member to move said first named means from engagement with one slot into engagement with the other when the control member is moved in one direction, and out of said other and into engagement with the first when moved in the opposite direction, and means to prevent relative movement between the control member and one slotted portion during the time said first named means engages the slot of the other slotted portion.

5. In a gearing control, two mutually overlying slotted members adapted to be relatively shifted, each slot having an inclined portion and horizontal portion, and controlling means arranged to traverse the slots and to be moved by the inclined portions from one horizontal portion to the other.

In testimony whereof, we hereunto affix our signatures.

CHARLES E. F. AHLM.
GEORGE L. ELMSLIE.